United States Patent
Guo et al.

(10) Patent No.: US 12,205,036 B2
(45) Date of Patent: Jan. 21, 2025

(54) APPARATUS AND METHODS FOR TRAINING IN FULLY CONNECTED LAYERS OF CONVOLUTIONAL NETWORKS

(71) Applicant: Cambricon Technologies Corporation Limited, Beijing (CN)

(72) Inventors: Qi Guo, Beijing (CN); Shijin Zhang, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 637 days.

(21) Appl. No.: 16/174,050

(22) Filed: Oct. 29, 2018

(65) Prior Publication Data

US 2019/0065958 A1 Feb. 28, 2019

Related U.S. Application Data

(63) Continuation-in-part of application No. PCT/CN2016/081114, filed on May 5, 2016.

(30) Foreign Application Priority Data

Apr. 29, 2016 (CN) .......................... 201610285062.0

(51) Int. Cl.
*G06N 3/084* (2023.01)
*G06N 3/04* (2023.01)
*G06N 3/08* (2023.01)

(52) U.S. Cl.
CPC .............. *G06N 3/084* (2013.01); *G06N 3/04* (2013.01); *G06N 3/08* (2013.01)

(58) Field of Classification Search
CPC ............ G06N 3/084; G06N 3/04; G06N 3/08; G06N 3/045; G06N 3/048; G06N 5/01; G06N 3/063
See application file for complete search history.

(56) References Cited

FOREIGN PATENT DOCUMENTS

| CN | 105488565 A | 4/2016 |
|----|-------------|--------|
| CN | 106991478 A | 7/2017 |

(Continued)

OTHER PUBLICATIONS

Touretzky, Backpropagation Learning, Lecture 15-486/782: Artificial Neural Networks, Computer Science Carnegie Mellon University, 2006 (Year: 2006).*

(Continued)

*Primary Examiner* — Aniss Chad
*Assistant Examiner* — Shien Ming Chou
(74) *Attorney, Agent, or Firm* — Getech Law LLC; Jun Ye

(57) ABSTRACT

Aspects for backpropagation in a fully connect layer of a convolutional neural network are described herein. The aspects may include a direct memory access unit configured to receive input data and one or more first data gradients from a storage device. The aspects may further include a master computation module configured to transmit the input data and the one or more first data gradients to one or more slave computation modules. The slave computation modules are respectively configured to multiply one of the one or more first data gradients with the input data to generate a default weight gradient vector.

10 Claims, 7 Drawing Sheets

(56) References Cited

FOREIGN PATENT DOCUMENTS

| WO | WO 2017/185394 A1 | 11/2017 | |
|----|----|----|----|
| WO | WO-2017185248 A1 * | 11/2017 | ............ G06N 3/0481 |

OTHER PUBLICATIONS

Lee Performance Analysis of Bit-Width Reduced FPU in FPGAs, Journal of Embedded Systems vol. 2009 (Year: 2009).*

Zhang Optimizing FPGA-based Accelerator Design for Deep Convolutional Neural Networks, FPGA' 15 ACM, (Year: 2015).*

Li Arithmetic formats for implementing artificial neural network, Can. J. Elect. Comput. Eng., vol. 31, No. 1, Winter, 2006 (Year: 2006).*

Hamalainen, TUTNC: a general purpose parallel computer for neural network computations, Microprocessors and Microsystems vol. 19, 1995 (Year: 1995).*

Fowers, A High Memory Bandwidth FPGA Accelerator for Sparse Matrix-Vector Multiplication, 2014 IEEE 22nd Annual International Symposium on Field-Programmable Custom Computing Machines, IEEE, 2014 (Year: 2014).*

T. Chen, et al., "A Small-Footprint Accelerator for Large-Scale Neural Networks", ACM Transactions on Computer Systems, vol. 33, No. 2, Article 6, May 2015, 27 pages.

Z. Du, et al., "An Accelerator for High Efficient Vision Processing", IEEE Transactions on Computer-aided Design of Integrated Circuits and System, vol. 36, No. 2, Feb. 2017, pp. 227-240.

S. Liu, et al., "Cambricon: An Instruction Set Architecture for Neural Networks", 2016 ACM/IEEE 43rd Annual International Symposium on Computer Architecture, Oct. 12, 2016, pp. 393-405.

S. Zhang, et al., "Cambricon-X" An Accelerator for Sparse Neural Networks", The 49th Annual IEEE/ACM International Symposium on Microarchitecture Article No. 20, Oct. 15, 2016, 12 pages.

Y. Chen, et al., "DaDianNao: A Machine-Learning Supercomputer", 2014 47th Annual IEEE/ACM International Symposium on Microarchitecture, Dec. 13, 2014, pp. 609-622.

T. Luo, et al., "DaDianNao: A Neural Network Supercomputer", IEEE Transaction on Computers, vol. 66, No. 1, Jan. 2017, pp. 73-88.

T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.

Y. Chen, et al., "DianNao Family: Energy-Efficient Hardware Accelerators for Machine Learning", Communications of the ACM, vol. 59, No. 11, Nov. 2016, pp. 105-112.

D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.

Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

EP 16899905.0—European Search Report, mailed Nov. 15, 2019, 4 pages.

Ramon J. Aliaga, et al., "System-on-Chip Implementation of Neural Network Training on FPGA", International Journal of Advances in Systems and Measurement, 2009, 12 pages.

Pedro O. Domingos, et al., "An Efficient and Scalable Architecture for Neural Networks With Backpropagation Learning" IEEE, 2005, 6 pages.

EP 16899905.0—Response to the Communication under Article 94(3) EPC, filed Jun. 24, 2020, 33 pages.

EP 16899905.0—Summons to attend Oral Proceedings, mailed Sep. 9, 2020, 12 pages.

Timo Hamalainen, et al., "TUTNC: a general purpose parallel computer for neural network computations", Elsevier Science B.V. Microprocessors and Microsystems vol. 19 No. 8 Oct. 1995, 19 pages.

Harri Klapuri, et. al., "Mapping artificial neural networks to a tree shape neurocomputer", 1996 Elsevier Science B.V., 10 pages.

CN 201610285062.0—Office Action, mailed Jul. 10, 2020, 9 pages. (no English translation).

PCT/CN2016/081114—International Search Report, mailed Feb. 3, 2017, 13 pages. (no English translation).

KR 1020187033950—Office Action, mailed Apr. 25, 2022, 8 pages, (with English translation).

* cited by examiner

700

```
┌─────────────────────────────────────────────────────────────────┐
│ Receiving, by a master computation module, input data and one  │  702
│ or more first data gradients from a storage device              │
└─────────────────────────────────────────────────────────────────┘
                                │
                                ▼
┌─────────────────────────────────────────────────────────────────┐
│ Transmitting, by the master computation module, the input data │  704
│ and the one or more first data gradients to one or more slave  │
│ computation modules                                             │
└─────────────────────────────────────────────────────────────────┘
                                │
                                ▼
┌─────────────────────────────────────────────────────────────────┐
│ Respectively multiplying, by the one or more slave computation │  706
│ modules, one of the one or more first data gradients with the  │
│ input data to generate a default weight gradient vector         │
└─────────────────────────────────────────────────────────────────┘
                                │
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Updating, by the master computation module, one or more weight │  708
│ values based on the default weight gradient vector              │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Respectively multiplying, by the one or more slave computation │  710
│ modules, one of the one or more input gradients with one or    │
│ more weight vectors in a weight matrix to generate one or more │
│ multiplication results                                          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Combining, by an interconnection unit, the one or more         │  712
│ multiplication results calculated respectively by the one or   │
│ more slave computation modules into an output gradient vector  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Fig. 7

APPARATUS AND METHODS FOR TRAINING IN FULLY CONNECTED LAYERS OF CONVOLUTIONAL NETWORKS

CROSS-REFERENCE TO RELATED APPLICATIONS

The present invention is a continuation-in-part of PCT Application No. PCT/CN2016/081114, filed on May 5, 2016, which claims priority to commonly owned CN Application No. 201610285062.0, filed on Apr. 29, 2016. The entire contents of each of the aforementioned applications are incorporated herein by reference.

TECHNICAL FIELD

The present disclosure generally relates to the technical field of artificial neural network, and specifically, relates to an apparatus and method for backpropagation in a fully connected layer of an artificial convolutional neural network.

BACKGROUND

Convolutional artificial neural networks have been widely applied in pattern recognition and image processing for its high efficiency. One known type of devices for convolutional artificial neural networks is to implement a general-purpose processor, which includes a general-purpose register file and a general-purpose functional unit to execute general purpose instructions to support algorithms for convolutional artificial neural networks. However, one of the defects of the method is lower operational performance of a single general-purpose processor which cannot meet performance requirements for usual multilayer neural network operations. When multiple general-purpose processors execute concurrently, the intercommunication among them also becomes a performance bottleneck.

Another known type of devices may involve a graphics processing unit (GPU), which includes a general-purpose register file and a general-purpose stream processing unit to execute general purpose single-instruction-multiple-data (SIMD) instructions to support the algorithms. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for backpropagation in a fully connected layer of a convolutional artificial neural network. The example apparatus may include a direct memory access unit configured to receive input data and one or more first data gradients from a storage device. The example apparatus may further include a master computation module configured to transmit the input data and the one or more first data gradients to one or more slave computation modules. The slave computation modules are respectively configured to multiply one of the one or more first data gradients with the input data to generate a default weight gradient vector.

Another example aspect of the present disclosure provides an example method for backpropagation in a fully connected layer of a convolutional artificial neural network. The example method may include receiving, by a direct memory access unit, input data and one or more first data gradients from a storage device; transmitting, by a master computation module, the input data and the one or more first data gradients to one or more slave computation modules; and respectively multiplying, by the one or more slave computation modules, one of the one or more first data gradients with the input data to generate a default weight gradient vector.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 is a flow chart of an example method for backpropagation in a fully connected layer of a convolutional neural network according to embodiments of the present disclosure.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
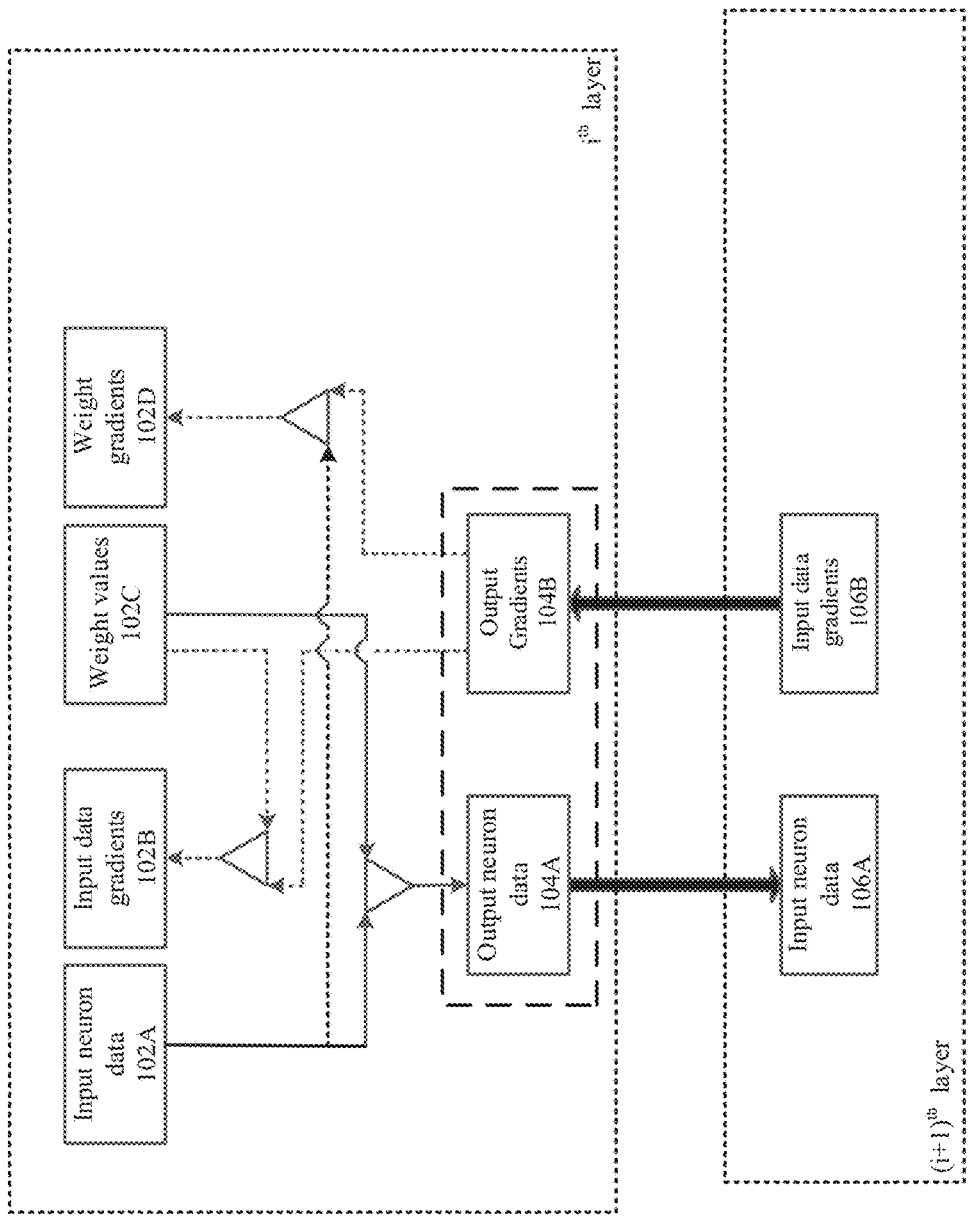
FIG. 1 is a block diagram illustrating an example forward propagation process and an example backpropagation process in a fully connected layer of a convolutional neural network.

FIG. 1 is a block diagram illustrating an example forward propagation process and an example backpropagation process (collectively, computing process 100) in a fully connected layer of a convolutional neural network. The computing process 100 is a merely example showing neural network operations that involve input data and weight values and is not limited to such operations. For example, other unshown neural network operations may include pooling operations, etc. Since convolution operation may be a major operation in the computing process 100, the illustrated multilayer neural network may be also referred to as a convolutional neural network.

A fully connected layer may refer to a layer of operations that include a matrix of weight values (hereinafter "weight matrix"), each weight value corresponding to an element of the input vector and an element of the output vector. In other words, for any pair of an element of the input vector and an element of the output vector, a weight value can be identified in the weight matrix.

As depicted, the example computing process 100 may be performed from the $i^{th}$ layer to the $(i+1)^{th}$ layer. The term "layer" here may refer to a group of operations, rather than a logic or a physical layer. A triangular-shaped operator (Δ as shown in FIG. 1) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire computing process. Rather, the layers of operations may refer to any two consecutive layers in a neural network. As described below in greater detail, the computing process from the $i^{th}$ layer to the $(i+1)^{th}$ layer may be referred to as a forward propagation process; the computing process from $(i+1)^{th}$ layer to the $i^{th}$ layer may be referred to as a backward propagation (also may be interchangeably referred to as backpropagation) process.

The forward propagation process may start from input neuron data received at the $i^{th}$ layer (e.g., input neuron data 102A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 102A may be multiplied or convolved by one or more weight values 102C. The results of the multiplication or convolution may be transmitted as output neuron data 104A. In some examples, an activation function may be applied to the output neuron data 104A. The output neuron data 104A may be transmitted to the next layer (e.g., the $(i+1)^{th}$ layer) as input neuron data 106A. The forward propagation process may be shown as the solid lines in FIG. 1.

The backward propagation process may start from the last layer of the forward propagation process. For example, the backward propagation process may include the process from the $(i+1)^{th}$ layer to the $i^{th}$ layer. During the process, the input data gradients 106B may be transmitted to the $i^{th}$ layer as output gradients 104B. Alternatively, a derivative of an activation function may be applied to the input data gradients 106B to generate the output gradients 104B.

The output gradients 104B may then be multiplied or convolved by the input neuron data 102A to generate weight gradients 102D. Additionally, the output gradients 104B may be multiplied by the weight values 102C to generate input data gradients 102B.

In some examples where the $(i+1)^{th}$ layer is the last layer of the forward propagation process, the input data gradients 106B may be determined based on a difference between the input neuron data 106A and expected neuron data. The backward propagation process may be shown as the dotted lines in FIG. 1.

Figure 2:
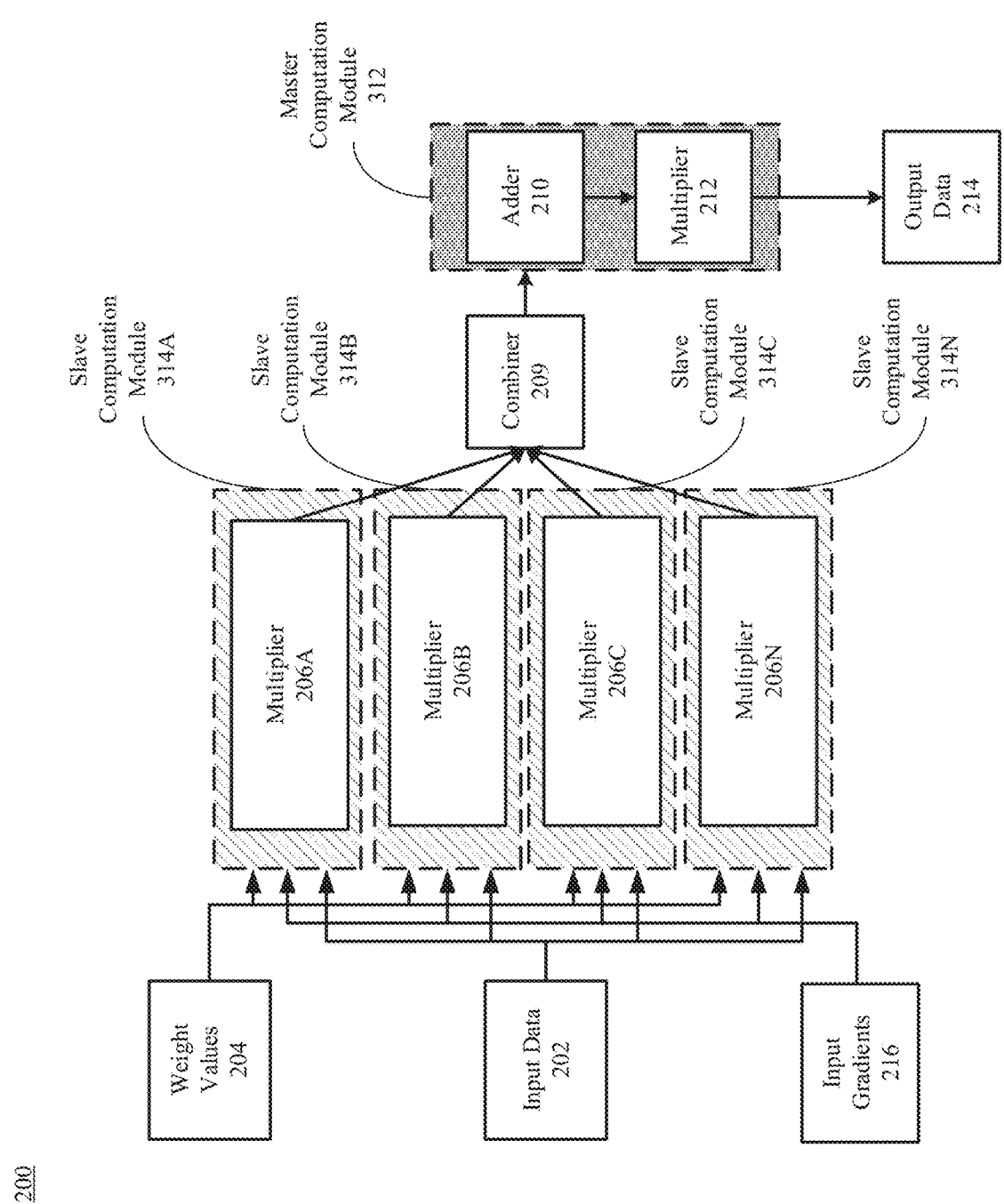
FIG. 2 is a block diagram illustrating an example backpropagation computing process in a fully connected layer of a convolutional neural network.

FIG. 2 is a block diagram illustrating an example backpropagation computing process in a fully connected layer of a convolutional neural network.

In the forward propagation process, the input data 202 (e.g., input neuron data 102A; hereinafter referred to as "$X_i$") may be transmitted to one or more slave computation modules 314 (e.g., 314A, 314B, 314C, . . . 314N). Each of the slave computation modules 314 may be configured to multiply the received Xi with one or more weight values 204. The weight values 204 stored in each of the slave computation modules 314 may refer to a portion of the weight values 102C. In other words, the weight values 102C may be divided into portions and respectively transmitted to the slave computation modules 314 and stored as the weight values 204. The multiplication results of the received Xi and the weight values 204 may be output to a combiner 209 of an interconnection unit. The combiner 209 may be configured to add the multiplication results. An activation function may be further applied to the sum of the multiplication results, e.g., by a master computation module 312.

As described according to FIG. 1, the backpropagation process may include two sub-processes, i.e., calculating the weight gradients 102D and calculating the input data gradients 102B. In the sub-process of calculating the weight gradients 102D, each of the slave computation modules 314 may receive the portion of the input data 202 and input gradients 216. The input gradients 216 may refer to one or more data gradients calculated at and output from a lower layer of the backpropagation process. For example, the input gradients 216 may refer to the output gradients 104B from the $(i+1)^{th}$ layer in FIG. 1. In some other examples, the master computation module 312 may be configured to apply a derivative of an activation function to the output gradients 104B to generate the input gradients 216. The activation function may be a sigmoid function, a tanh function, a relu function, and a softmax function.

Each of the slave computation modules 314 may be configured to multiply a scalar value (i.e., an element) of the input gradients 216 with the input data 202 (e.g., Xi) to generate a default weight gradient vector. The master computation module 312 may be configured to update the weight values 204 based on the default weight gradient vector. For example, the master computation module 312 may be configured to update the weight values 204 in accordance with the following equation: w'=w+a*dw, in which w' represents the updated weight values, w represents the weight values 204, a represents an adjustable parameter, and dw represents the default weight gradients.

In some other example, the master computation module 312 may be configured to calculate a scaled weight gradient vector to update the weight values 204. In more detail, the master computation module 312 may be configured to calculate a quadratic mean of the default weight gradient vector. The quadratic mean may be represented as $$\sqrt{\frac{\Sigma dw^2}{n}},$$

in which n may refer to a count of the slave computation modules 314. Further, the master computation module 312 may be configured to compare the quadratic mean to a predetermined threshold. If the quadratic mean is greater than the threshold, the master computation module 312 may be configured to calculate a scaled weight gradient vector based on the threshold and the quadratic mean. For example, the scaled weight gradient vector may be calculated in accordance with the following equation: dw'=dw/c*t, in which dw represents the default weight gradient vector, c represents the quadratic mean, t represents the predetermined threshold, and dw' represents the scaled weight gradient vector. The weight values 204 or 102C may be updated based on the scaled weight gradient vector. That is, the master computation module 312 may be configured to add the scaled weight gradient vector to the weight values 204 or 102C to generate a new set of weight values.

In the sub-process of calculating the input data gradients 102B, the slave computation modules 314 may be configured to multiply the input gradients 216 with the weight values 204. In some examples, the weight values 204 may be formatted as a weight matrix that includes multiple column vectors and the input gradients 216 may be formatted as an input gradient vector. The slave computation modules 314 may be respectively calculate an element of the input gradient vector with a column vector of the weight matrix to generate one or more multiplication results. The multiplication results may be further combined by the combiner 209 to generate an output gradient vector that includes the input data gradients 102B.

Figure 3:
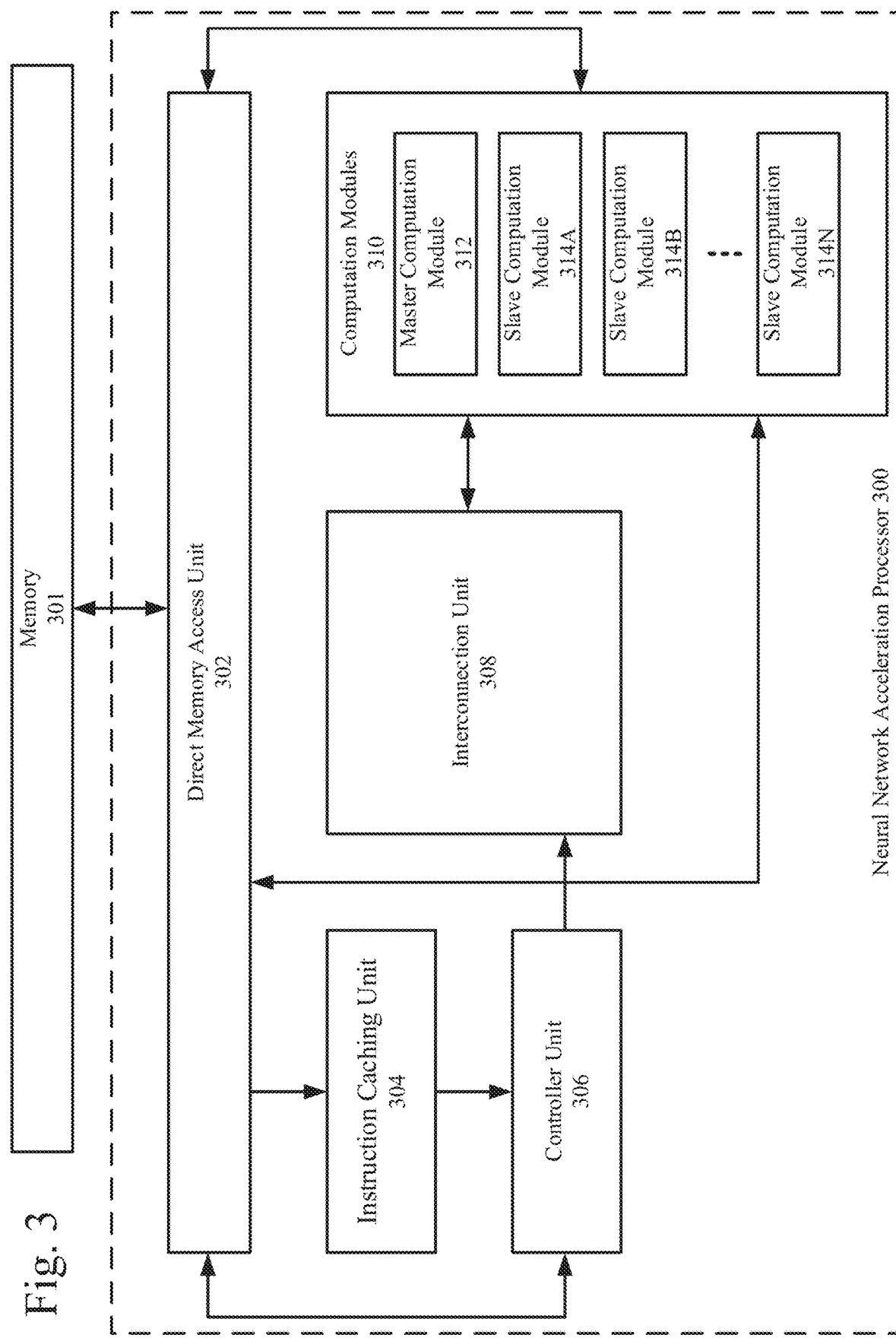
FIG. 3 is a block diagram illustrating an overall structure of a neural network acceleration processor by which backpropagation may be implemented in a fully connected layer of a convolutional neural network.

FIG. 3 is a block diagram illustrating an overall structure of a neural network acceleration processor 300 by which a backpropagation process at a fully connected layer may be implemented in a convolutional neural network.

As shown in FIG. 3, the neural network acceleration processor 300 includes an instruction caching unit 304, a controller unit 306, a direct memory access unit 302, an interconnection unit 308, a plurality of computation module 310 that may include the master computation module 312, and the slave computation modules 314 (e.g., 314A, 314B . . . 314N). Any of the above-mentioned components or devices may be implemented by a hardware circuit (e.g., application specific integrated circuit (ASIC)).

In some examples, the instruction caching unit 304 may be configured to receive or read instructions from the direct memory access unit 302 and cache the received instructions. The controller unit 306 may be configured to read instructions from the instruction caching unit 304 and decode one of the instructions into micro-instructions for controlling operations of other modules including the direct memory access unit 302, the master computation module 312, the slave computation modules 314, etc. In other words, the modules including the direct memory access unit 302, the master computation module 312, and the slave computation modules 314 may be configured to respectively perform the micro-instructions.

The direct memory access unit 302 may be configured to access an external address range (e.g., in an external storage device such as a memory 301) and directly read or write data into respective caching units in the computation modules 310.

In some example, an IO instruction may be pre-stored into a head address of the instruction caching unit 304. The IO instruction may instruct the direct memory access unit 302 to read the input data 202 from an external address space, e.g., the memory 301. The IO instruction may further instruct the direct memory access unit 302 to store the output data 214 back into the external space after completion of computation.

The controller unit 306 may be configured to read the IO instruction from the head address of the instruction caching unit 304. According to the decoded micro-instruction, the direct memory access unit 302 may be configured to read data relevant to the forward propagation (e.g., the input data 202, an interpolation table for the activation function, a bias value, parameters to configure the computation modules 310) and to store the above data to the master computation module 312.

The controller unit 306 may be further configured to read a next IO instruction from the instruction caching unit 304. According to the decoded micro-instructions of this IO instruction, the direct memory access unit 302 may be configured to read the weight values 204 and the input data 202 from the memory 301. The weight values 204 may be respectively transmitted to the slave computation modules 314.

Further still, the controller unit 306 may be configured to read a CONFIG instruction from the instruction caching unit 304 to configure the parameters for processing at the computation modules 310.

Once the computation modules 310 are configured accordingly, the controller unit 306 may be configured to read a COMPUTE instruction. The master computation module 312 may be configured, according the decoded micro-instruction of the COMPUTE instruction, to transmit the input data 202 (e.g., $X_i$) to the slave computation modules 314 via the interconnection unit 308. Further, the master computation module 312 may be configured to transmit the input gradients 216 to the slave computation modules 314.

In accordance with the decoded micro-instructions, each of the slave computation modules 314 may be configured to multiply the input gradients 216 with the input data 202 (e.g., $X_i$) to generate a default weight gradient vector. The master computation module 312 may be configured to update the weight values 204 based on the default weight gradient vector. For example, the master computation module 312 may be configured to update the weight values 204 in accordance with the following equation: w'=w+a*dw, in which w' represents the updated weight values, w represents the weight values 204, a represents an adjustable parameter, and dw represents the default weight gradients.

In some other example, the master computation module 312 may be configured to calculate a scaled weight gradient vector to update the weight values 204. In more detail, the master computation module 312 may be configured to calculate a quadratic mean of the default weight gradient vector. The quadratic mean may be represented as $$\sqrt{\frac{\Sigma dw^2}{n}},$$

in which n may refer to a count of the slave computation modules 314. Further, the master computation module 312 may be configured to compare the quadratic mean to a predetermined threshold. If the quadratic mean is greater than the threshold, the master computation module 312 may be configured to calculate a scaled weight gradient vector based on the threshold and the quadratic mean. For example, the scaled weight gradient vector may be calculated in accordance with the following equation: dw'=dw/c*t, in which dw represents the default weight gradient vector, c represents the quadratic mean, t represents the predetermined threshold, and dw' represents the scaled weight gradient vector. The weight values 204 or 102C may be updated based on the scaled weight gradient vector. That is, the master computation module 312 may be configured to add the scaled weight gradient vector to the weight values 204 or 102C to generate a new set of weight values.

Additionally, the slave computation modules 314 may be configured to multiply the input gradients 216 with the weight values 204. In some examples, the weight values 204 may be formatted as a weight matrix that includes multiple column vectors and the input gradients 216 may be formatted as an input gradient vector. The slave computation modules 314 may be respectively calculate an element of the input gradient vector with a column vector of the weight matrix to generate one or more multiplication results. The multiplication results may be further combined by the combiner 209 to generate an output gradient vector that includes the input data gradients 102B.

Formats of the abovementioned instructions are provided here in Table 1.

Figure 4:
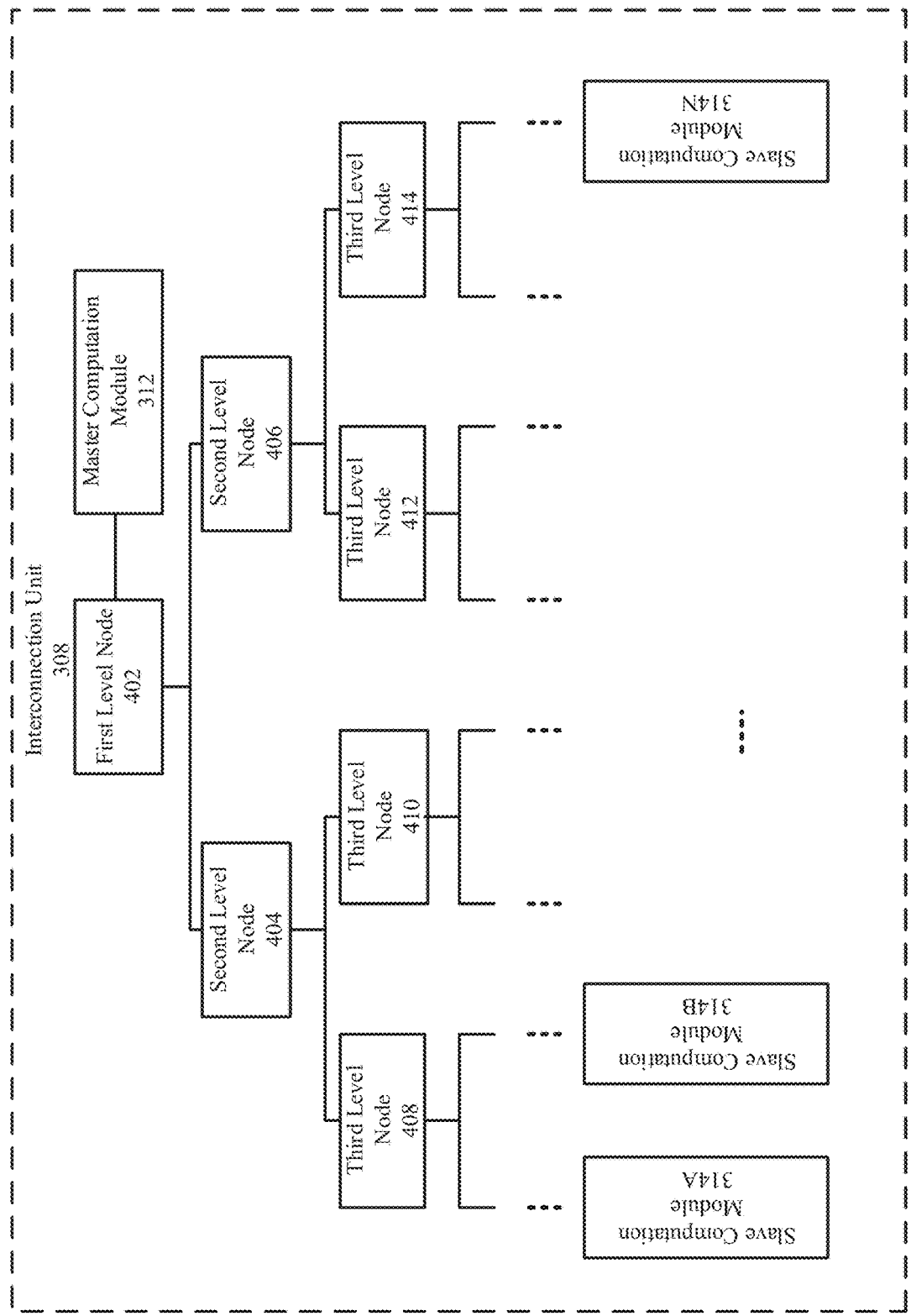
FIG. 4 is a block diagram illustrating an overall structure of an interconnection unit by which backpropagation may be implemented in a fully connected layer of a convolutional neural network.

FIG. 4 is a block diagram illustrating an overall structure of an interconnection unit by which backpropagation may be implemented in a convolutional neural network.

As depicted, the interconnection unit 308 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

As shown in FIG. 4, the nodes of the binary tree at the lowest levels may be connected to the slave computation modules 314. The data output from the slave computation modules 314 may be combined or summed at the multiple levels to generate a value or a vector at the first level node 402. The generated value or vector may be transmitted to the master computation module 312.

Figure 5:
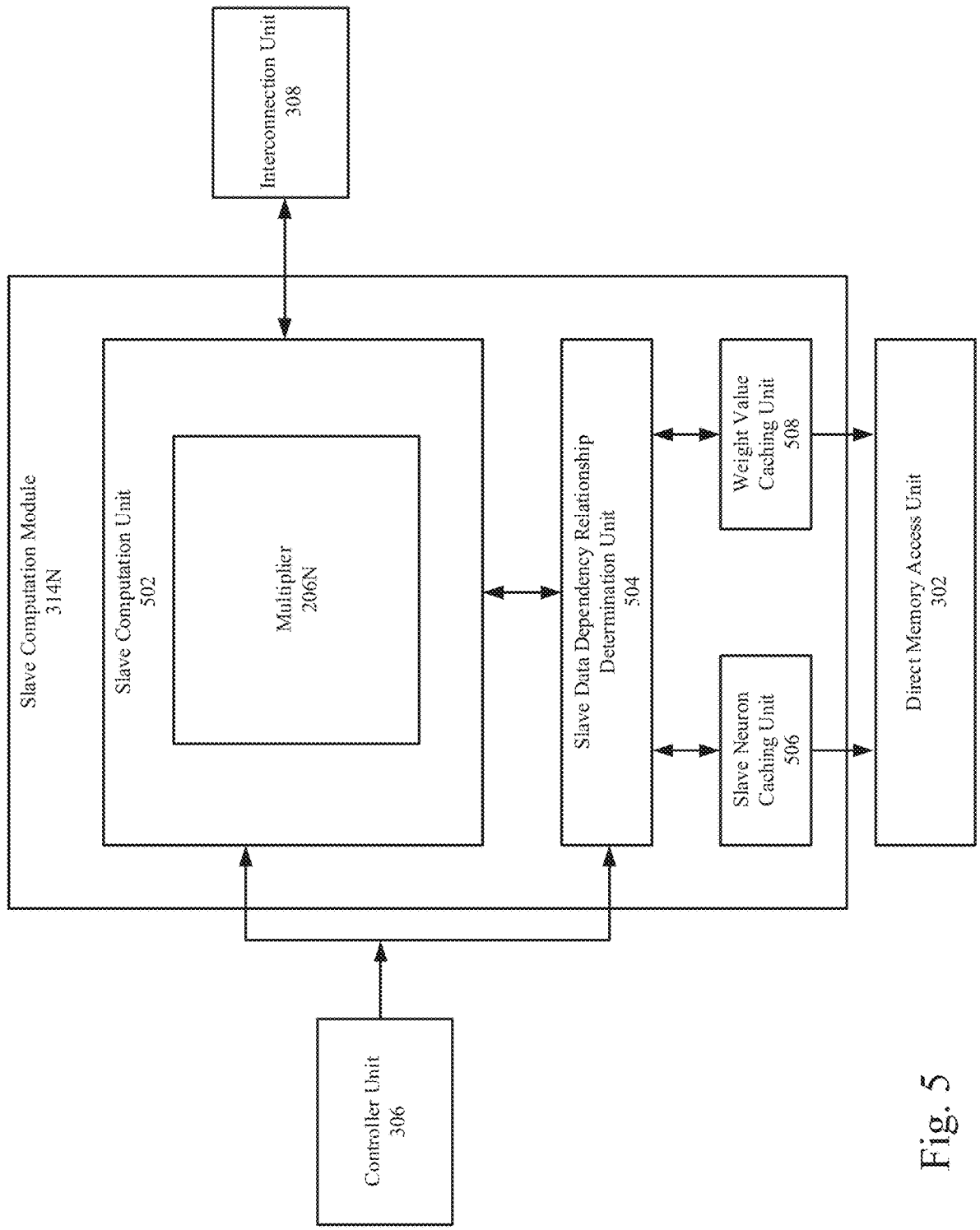
FIG. 5 is a block diagram illustrating the overall structure of a slave computation module by which backpropagation may be implemented in a fully connected layer of a convolutional neural network.

FIG. 5 is a block diagram illustrating the overall structure of a slave computation module 314N by which backpropagation may be implemented in a convolutional neural network.

As shown in FIG. 5, the slave computation module 314N comprises a slave computation unit 502, a slave data dependency relationship determination unit 504, a slave neuron caching unit 506, and a weight value caching unit 508. Hereinafter, a caching unit (e.g., a master neuron caching unit 606, a slave neuron caching unit 506, a weight value caching unit 508, etc.) may refer to an on-chip caching unit integrated in the neural network acceleration processor 300, rather than other storage devices in memory 301 or other external devices. In some examples, the on-chip caching unit may be implemented as an on-chip buffer, an on-chip Static Random Access Memory (SRAM), or other types of on-chip storage devices that may provide higher access speed than the external memory.

TABLE 1

| Instruction (Operation Code) | Register 0 | Register 1 | Register 2 | Register 3 | Register 4 | Register 5 | Register 6 |
| --- | --- | --- | --- | --- | --- | --- | --- |
| COMPUTE | Starting address of input data | Data length of input data | Starting address of convolution kernel | Data length of convolution kernel | Starting address of output gradients | Data length of output gradients | Address of interpolation table of activation function |
| IO | Address of external storage device | Data length | Address of internal storage device | | | | |
| NOP | | | | | | | |
| JUMP | Target address | | | | | | |
| MOVE | Address of input data | Data size | Address of output data | | | | |

The slave data dependency relationship determination unit 504 may be configured to perform data access operations (e.g., reading or writing operations) on the caching units including the slave neuron caching unit 506 and the weight value caching unit 508 during the computation process. The slave data dependency relationship determination unit 504 may be configured to prevent conflicts in reading and writing of the data in the caching units including the slave neuron caching unit 506 and the weight value caching unit 508. For example, the slave data dependency relationship determination unit 504 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 504 may be stored in an instruction queue within the slave data dependency relationship determination unit 504. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 506 may be configured to store the input data 202 and the weight value caching unit 508 may be configured to store the weight values 204.

The slave computation unit 502 may be configured to receive micro-instructions from the controller unit 306 and perform arithmetical logic operations according to the micro-instructions. In some example, slave computation unit 502 may further include the multiplier 206N and the adder 208N.

In the sub-process of calculating the weight gradients 102D, each of the slave computation modules 314 may receive the portion of the input data 202 and input gradients 216. The multiplier 206N may be configured to multiply a scalar value (i.e., an element) of the input gradients 216 with the input data 202 (e.g., Xi) to generate a default weight gradient vector. The default weight gradient vector may be transmitted to the interconnection unit 308.

In the sub-process of calculating the input data gradients 102B, the multiplier 206N may be configured to multiply the input gradients 216 with the weight values 204. In some examples, the weight values 204 may be formatted as a weight matrix that includes multiple column vectors and the input gradients 216 may be formatted as an input gradient vector. The multiplier 206N may be configured to calculate an element of the input gradient vector with a column vector of the weight matrix to generate a multiplication result. The multiplication results generated by the slave computation modules 314 may be further combined to generate an output gradient vector that includes the input data gradients 102B.

Figure 6:
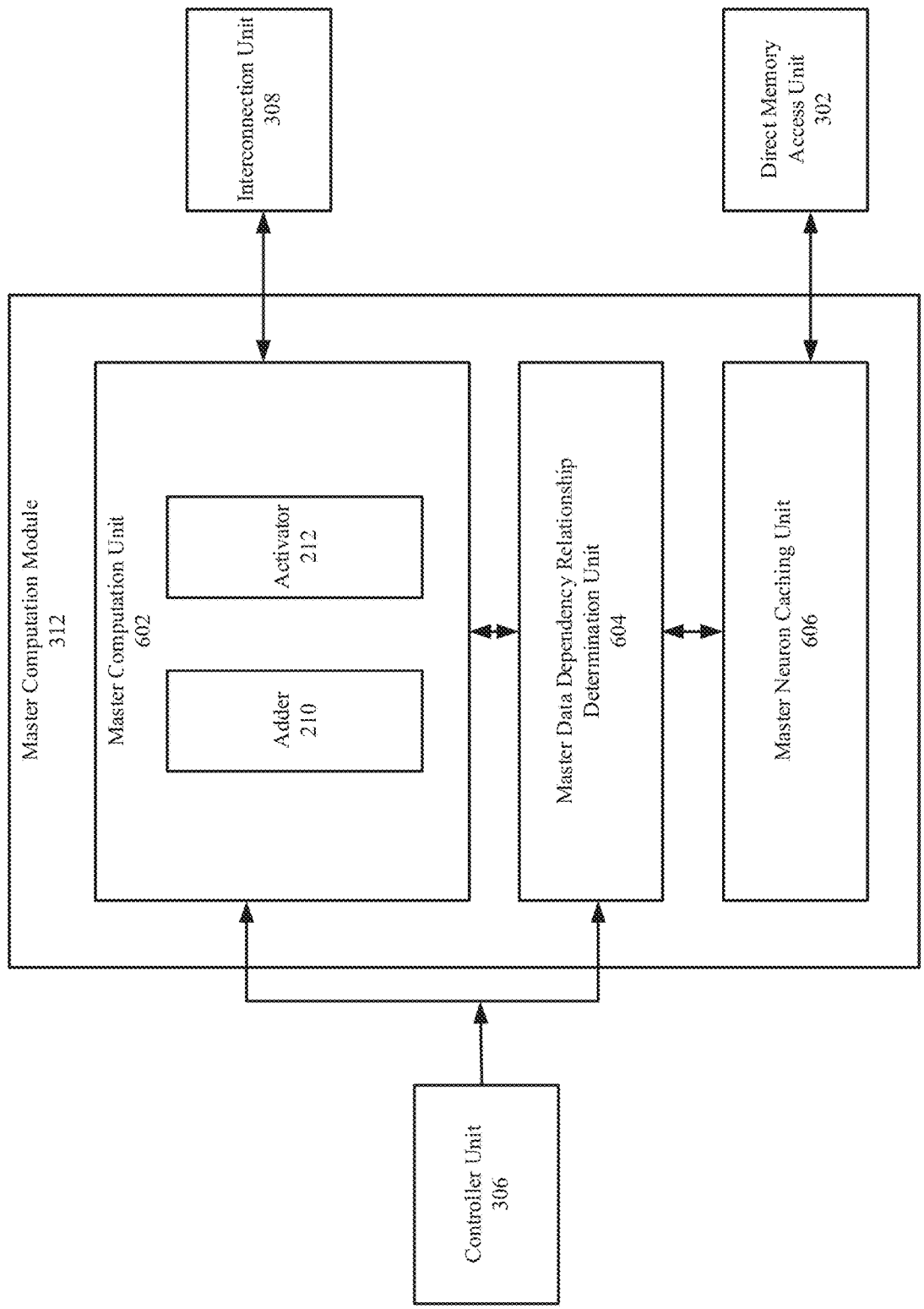
FIG. 6 is a block diagram illustrating the overall structure of a master computation module by which forward propagation may be implemented in a fully connected layer of a convolutional neural network.

FIG. 6 is a block diagram illustrating the overall structure of a master computation module by which forward propagation may be implemented in a convolutional neural network.

As shown in FIG. 6, the master computation module 312 may include a master computation unit 602, a master data dependency relationship determination unit 604, and a master neuron caching unit 606. The master computation unit 602 may further include a window controller 608, an adder 210, and an activator 212.

Similar to the slave data dependency relationship determination unit 504, the master data dependency relationship determination unit 604 may be configured to perform data access operations (e.g., reading or writing operations) on the caching units including the master neuron caching unit 606 during the computation process. The master data dependency relationship determination unit 604 may be configured to prevent conflicts in reading and writing of the data in the caching units including the master neuron caching unit 606. For example, the master data dependency relationship determination unit 604 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the master data dependency relationship determination unit 604 may be stored in an instruction queue within the master data dependency relationship determination unit 604. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The master neuron caching unit 606 may be configured to store the weight values 204 and results calculated by the slave computation modules 314.

In the sub-process of calculating the weight gradients 102D, the adder 210 may be configured to update the weight values 204 based on the default weight gradient vector. For example, the adder 210 may be configured to update the weight values 204 in accordance with the following equation: w'=w+a*dw, in which w' represents the updated weight values, w represents the weight values 204, a represents an adjustable parameter, and dw represents the default weight gradients.

In the sub-process of calculating the input data gradients 102B, the adder 210 may be configured to combine the multiplication results generated by the slave computation modules 314 to generate an output gradient vector that includes the input data gradients 102B.

In some examples, the activator 212 may be configured to apply a derivative of an activation function to the output gradients 104B to generate the input gradients 216. The activation function may be a sigmoid function, a tanh function, a relu function, and a softmax function.

FIG. 7 is a flow chart of an example method 700 for backpropagation in a convolutional neural network according to embodiments of the present disclosure. The example method 700 may be performed by one or more components as described in FIGS. 2, 3, 5, and 6. Optional operations may be indicated by dash-lined blocks.

At block 702, the example method 700 may include receiving, by a master computation module, input data and one or more first data gradients. For example, the master computation module 312 may be configured to receive the input data 202 from the memory 301. The input data 202 may be further transmitted to the master computation module 312 via the interconnection unit 308. The master computation module 312 may be further configured to receive the input gradients 216 from the one or more slave computation modules 314. The input gradients 216 may refer to one or more data gradients calculated at and output from a lower layer of the backpropagation process.

At block 704, the example method 700 may include transmitting, by a master computation module, the input data and the one or more first data gradients to one or more slave computation modules. For example, the master computation module 312 may be configured to transmit the input data 202 and the input gradients 216 to the slave computation modules 314.

At block 706, the example method 700 may include respectively multiplying, by the one or more slave computation modules, one of the one or more first data gradients with the input data to generate a default weight gradient vector. For example, each of the slave computation modules 314 may be configured to multiply a scalar value (i.e., an element) of the input gradients 216 with the input data 202 (e.g., Xi) to generate a default weight gradient vector.

At block 708, the example method 700 may optionally include updating, by the master computation module, one or more weight values based on the default weight gradient vector. For example, the master computation module 312 may be configured to update the weight values 204 based on the default weight gradient vector. For example, the master computation module 312 may be configured to update the weight values 204 in accordance with the following equation: $w'=w+a*dw$, in which $w'$ represents the updated weight values, w represents the weight values 204, a represents an adjustable parameter, and dw represents the default weight gradients.

At block 710, the example method 700 may optionally include respectively multiplying, by the one or more slave computation modules, one of the one or more input gradients with one or more weight vectors in a weight matrix to generate one or more multiplication results. For example, the slave computation modules 314 may be configured to multiply the input gradients 216 with the weight values 204. In some examples, the weight values 204 may be formatted as a weight matrix that includes multiple column vectors and the input gradients 216 may be formatted as an input gradient vector. The slave computation modules 314 may be respectively calculate an element of the input gradient vector with a column vector of the weight matrix to generate one or more multiplication results.

At block 712, the example method 700 may optionally include combining, by an interconnection unit, the one or more multiplication results calculated respectively by the one or more slave computation modules into an output gradient vector. For example, the multiplication results may be further combined by the combiner 209 of the interconnection unit 308 to generate an output gradient vector that includes the input data gradients 102B.

The utilization of the apparatus and instruction set for performing the forward computation of artificial neural networks eliminates the defects caused by lower performance of CPU and GPU operation as well as high overhead of front-end transcoding, which effectively improvs the support to forward computations of multi-layer artificial neural networks.

In addition, the utilization of a specific on-chip cache for the forward computation of multi-layer artificial neural network thoroughly explores the reusability of input neurons and weight data and avoids the repeatedly reading of data from memory. The requirement for memory access bandwidth is also lowered and thus the memory bandwidth will not become a bottleneck for performance of the forward computation of multi-layer artificial neural networks.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation.

We claim:

1. An integrated circuit (IC) chip for backpropagation in a fully connected layer of a neural network, comprising:
    a controller circuit configured to receive an instruction; and
    one or more computation circuits that include:
        a master computation circuit,
        one or more slave computation circuits, and
        an interconnection circuit communicatively connected to the master computation circuit and the one or more slave computation circuits,
    wherein the master computation circuit configured to
        receive input data and one or more first data gradients in response to the instruction, and
        transmit the input data and the one or more first data gradients to the one or more slave computation circuits, and
    wherein the one or more slave computation circuits are respectively configured to multiply one of the one or more first data gradients with the input data to generate a default weight gradient vector,
    wherein the master computation circuit is further configured to update one or more weight values based on the default weight gradient vector,
    wherein the master computation circuit is further configured to apply a derivative of an activation function to the one or more first data gradients to generate one or more input gradients,
    wherein the one or more slave computation circuits are respectively configured to multiply one of the one or more input gradients with one or more weight vectors in a weight matrix to generate one or more multiplication results, and
    wherein the interconnection circuit is configured to combine the one or more multiplication results of a lower dimension into an output gradient vector of a higher dimension.

2. The IC chip of claim 1, wherein the master computation circuit is further configured to
    calculate a scaled weight gradient vector based on the default weight gradient vector and a predetermined threshold value; and update one or more weight values based on the scaled weight gradient vector.

3. The IC chip of claim 1, wherein the interconnection circuit is configured to channel data between the master computation circuit and the one or more slave computation circuits.

4. The IC chip of claim 1, wherein each of the one or more slave computation circuits includes a slave neuron caching circuit, wherein the slave neuron caching circuit is configured to store the one or more first data gradients with the input data.

5. The IC chip of claim 1, wherein each of the one or more slave computation circuits includes a weight value caching circuit, wherein the weight value caching circuit is configured to store the weight matrix that includes the one or more weight vectors.

6. A method for backpropagation in a fully connected layer of a neural network, comprising:
   receiving, by a controller circuit, an instruction;
   receiving, by a master computation circuit, input data and one or more first data gradients in response to the instruction;
   transmitting, by the master computation circuit, the input data and the one or more first data gradients to one or more slave computation circuits, wherein the master computation circuit is communicatively connected to the one or more slave computation circuits via an interconnection circuit;
   respectively multiplying, by the one or more slave computation circuits, one of the one or more first data gradients with the input data to generate a default weight gradient vector;
   updating, by the master computation circuit, one or more weight values based on the default weight gradient vector;
   applying, by the master computation circuit, a derivative of an activation function to the one or more first data gradients to generate one or more input gradients;
   respectively multiplying, by the one or more slave computation circuits, one of the one or more input gradients with one or more weight vectors in a weight matrix to generate one or more multiplication results; and
   combining, by the interconnection circuit, the one or more multiplication results of a lower dimension into an output gradient vector of a higher dimension.

7. The method of claim 6, further comprising
   calculating, by the master computation circuit, a scaled weight gradient vector based on the default weight gradient vector and a predetermined threshold value; and
   updating, by the master computation circuit, one or more weight values based on the scaled weight gradient vector.

8. The method of claim 6, further comprising channeling, by the interconnection circuit, data between the master computation circuit and the one or more slave computation circuits.

9. The method of claim 6, further comprising storing, by a slave neuron caching circuit of each of the one or more slave computation circuits, the one or more first data gradients with the input data.

10. The method of claim 6, further comprising storing, by a weight value caching circuit of each of the one or more slave computation circuits, the weight matrix that includes the one or more weight vectors.

* * * * *